(12) United States Patent
Kaino (10) Patent No.: US 10,472,866 B2
(45) Date of Patent: Nov. 12, 2019

(54) OPENING AND CLOSING BODY CONTROL APPARATUS FOR VEHICLE

(71) Applicant: AISIN SEIKI KABUSHIKI KAISHA, Kariya-shi (JP)

(72) Inventor: Takashi Kaino, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 159 days.

(21) Appl. No.: 15/670,095

(22) Filed: Aug. 7, 2017

(65) Prior Publication Data
US 2018/0087297 A1    Mar. 29, 2018

(30) Foreign Application Priority Data
Sep. 23, 2016 (JP) .................. 2016-186101

(51) Int. Cl.
| | | |
|---|---|---|
| E05B 81/56 | (2014.01) | |
| E05B 81/20 | (2014.01) | |
| E05B 81/36 | (2014.01) | |
| E05B 81/72 | (2014.01) | |
| E05B 83/40 | (2014.01) | |
| B60J 5/04 | (2006.01) | |
| E05B 77/54 | (2014.01) | |

(52) U.S. Cl.
CPC ............ *E05B 81/56* (2013.01); *E05B 81/20* (2013.01); *E05B 81/36* (2013.01); *E05B 81/72* (2013.01); *E05B 83/40* (2013.01); *B60J 5/047* (2013.01); *E05B 77/54* (2013.01)

(58) Field of Classification Search
CPC .......... E05B 81/54; E05B 81/56; E05B 81/64; E05B 81/66

USPC ........................................... 292/2, 4
See application file for complete search history.

(56) References Cited

U.S. PATENT DOCUMENTS

| 6,685,239 B2 | 2/2004 | Yamauchi et al. |
| 2004/0256883 A1* | 12/2004 | Ichinose .............. B60J 5/06 296/155 |
| 2007/0210588 A1* | 9/2007 | Cetnar ............... E05B 77/26 292/216 |

(Continued)

FOREIGN PATENT DOCUMENTS

| JP | 2002-250162 | 9/2002 |
| JP | 3666732 | 6/2005 |

OTHER PUBLICATIONS

U.S. Appl. No. 15/670,079, filed Aug. 7, 2017, US 2018-0087296 A1, Takashi Kaino.

*Primary Examiner* — Adi Amrany
(74) *Attorney, Agent, or Firm* — Oblon, McClelland, Maier & Neustadt, L.L.P.

(57) ABSTRACT

An opening and closing body control apparatus for a vehicle includes: a lock device that has a latch mechanism; and a control device that controls an operation of the lock device. The lock device has a rotation member rotating in first and second directions, and the latch mechanism performs close and release operations according to a rotating direction of the rotation member. The control device executes a close control for rotating the rotation member from a neutral position to a first position in the first direction in order to cause the latch mechanism to perform the close operation. The control device includes a neutral control portion, a vehicle state detection portion, and a restart control portion.

8 Claims, 9 Drawing Sheets

(56) References Cited

U.S. PATENT DOCUMENTS

| | | | |
|---|---|---|---|
| 2012/0256429 A1* | 10/2012 | Nagaoka | E05B 77/34 |
| | | | 292/200 |
| 2015/0042108 A1* | 2/2015 | Okawa | E05B 81/15 |
| | | | 292/194 |
| 2015/0233158 A1* | 8/2015 | Shimura | E05B 85/243 |
| | | | 292/200 |
| 2016/0002959 A1* | 1/2016 | Javadzadeh | E05B 77/12 |
| | | | 701/46 |
| 2017/0022746 A1* | 1/2017 | Kaino | E05B 81/56 |
| 2018/0355636 A1* | 12/2018 | Ichinose | E05B 47/0012 |
| 2019/0003213 A1* | 1/2019 | Yokomori | B60J 5/00 |

* cited by examiner

UNLATCHED STATE

FIG.5

WHEN A STRIKER ENTERS

FIG.6

HALF LATCH STATE

FIG.7

WHEN CLOSE OPERATION IS PERFORMED

FIG.8

FULL LATCH STATE

FIG. 9

WHEN RELEASE OPERATION IS PERFORMED

FIG. 10

NORMAL (P0: NEUTRAL POSITION)

FIG. 11
WHEN CLOSE OPERATION IS PERFORMED(FIRST POSITION P1)

FIG. 12
WHEN RELEASE OPERATION IS PERFORMED(SECOND POSITION P2)

FIG.13

OPENING AND CLOSING BODY CONTROL APPARATUS FOR VEHICLE

CROSS REFERENCE TO RELATED APPLICATIONS

This application is based on and claims priority under 35 U.S.C. § 119 to Japanese Patent Application 2016-186101, filed on Sep. 23, 2016, the entire contents of which are incorporated herein by reference.

TECHNICAL FIELD

This disclosure relates to an opening and closing body control apparatus for a vehicle.

BACKGROUND DISCUSSION

In the related art, in an opening and closing body control apparatus for a vehicle having a drive source and moving an opening and closing body of a vehicle, for example, as in a slide door control device disclosed in Japanese Patent No. 3666732 (Reference 1), a drive control of the slide door that is an opening and closing body is stopped when a power source voltage is lowered. After restoring the lowered power source voltage, the drive control is restarted before the stop.

That is, in a vehicle having a vehicle-mounted power source with a limited capacity, for example, the power source voltage is temporarily lowered due to start of cranking of an engine or the like. In such a state, in a case where the drive control of the slide door is executed, the supply of drive power is unstable. Therefore, there is a problem that a smooth opening and closing operation of the slide door cannot be guaranteed.

However, occurrence of such a problem can be prevented by adopting the configuration of the related art described above. After restoring the power source voltage, the opening and closing operation of the slide door is automatically restarted so that convenience can be improved.

In addition, normally, a lock device including a latch mechanism is provided in the opening and closing body of a vehicle. For example, a lock device disclosed in JP 2002-250162A (Reference 2) has a rotation member that rotates in a first direction and a second direction. When the rotation member rotates from a neutral position in the first direction, the latch mechanism performs a close operation and when the rotation member rotates from the neutral position in the second direction, the latch mechanism performs a release operation.

However, in a case where a close control causing the latch mechanism to perform a close operation is stopped on the way, an engagement state of the latch mechanism may be changed during stop. In such a case, the lock device may not function correctly only by resuming the close control, so in this respect, there is still room for improvement.

Thus, a need exists for an opening and closing body control apparatus for a vehicle which is not susceptible to the drawback mentioned above.

SUMMARY

It is preferable that an opening and closing body control apparatus for a vehicle according to an aspect of this disclosure includes a lock device that has a latch mechanism; and a control device that controls an operation of the lock device, the lock device has a rotation member rotating in a first direction and a second direction, and the latch mechanism performs a close operation and a release operation according to a rotating direction of the rotation member, the control device executes a close control for rotating the rotation member from a neutral position to a first position in the first direction in order to cause the latch mechanism to perform the close operation, and the control device includes a neutral control portion that reversely rotates the rotation member to the neutral position in a case where the close control becomes possible to be performed after the stop of the close control on the way, a vehicle state detection portion that detects moving of a vehicle after a start of the close control, and a restart control portion that restarts the close control without executing a neutral control for rotating the rotation member to the neutral position when the close control becomes possible to be performed after the stop of the close control on the way, in a case where moving of the vehicle is detected after the lock device holds the opening and closing body at a fully closed position and the close control is started.

It is preferable that an opening and closing body control apparatus for a vehicle according to another aspect of this disclosure includes a lock device that has a latch mechanism; and a control device that controls an operation of the lock device, the lock device has a rotation member rotating in a first direction and a second direction from a neutral position, and the latch mechanism performs a close operation and a release operation according to a rotating direction of the rotation member, the control device executes a close control for rotating the rotation member from the neutral position to a first position in the first direction in order to cause the latch mechanism to perform the close operation, the lock device has a half latch switch and a full latch switch which detect a state of the operation of the latch mechanism, the control device detects the state of the operation of the latch mechanism from ON and OFF states of the half latch switch and the full latch switch, and the opening and closing body is in a half door state in a case where the half latch switch is in the OFF state and the full latch switch is in the ON state, and the control device includes a neutral control portion that executes a neutral control for rotating the rotation member to the neutral position in a case where the close control becomes possible to be performed after a stop of the close control on the way, a vehicle state detection portion that detects moving of a vehicle after a start of the close control, and a restart control portion that restarts the close control without executing the neutral control for rotating the rotation member to the neutral position when the close control becomes possible to be performed after the stop of the close control on the way in a case where moving of the vehicle is detected after the opening and closing body is in the half door state and the start of the close control.

It is preferable that an opening and closing body control apparatus for a vehicle to another aspect of this disclosure includes a lock device that has a latch mechanism; and a control device that controls an operation of the lock device, the lock device has the latch mechanism which performs a close operation by shifting a half latch state to a full latch state, and the control device includes an initialization control portion that initializes the close operation in a case where the close control becomes possible to be performed after the close control causing the latch mechanism to perform the close operation is stopped on the way, and a retry control portion that executes the close control again after initialization of the close operation.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of an opening and closing body control apparatus for a vehicle embodied in a power slide door apparatus will be described with reference to the drawings.

Figure 1:
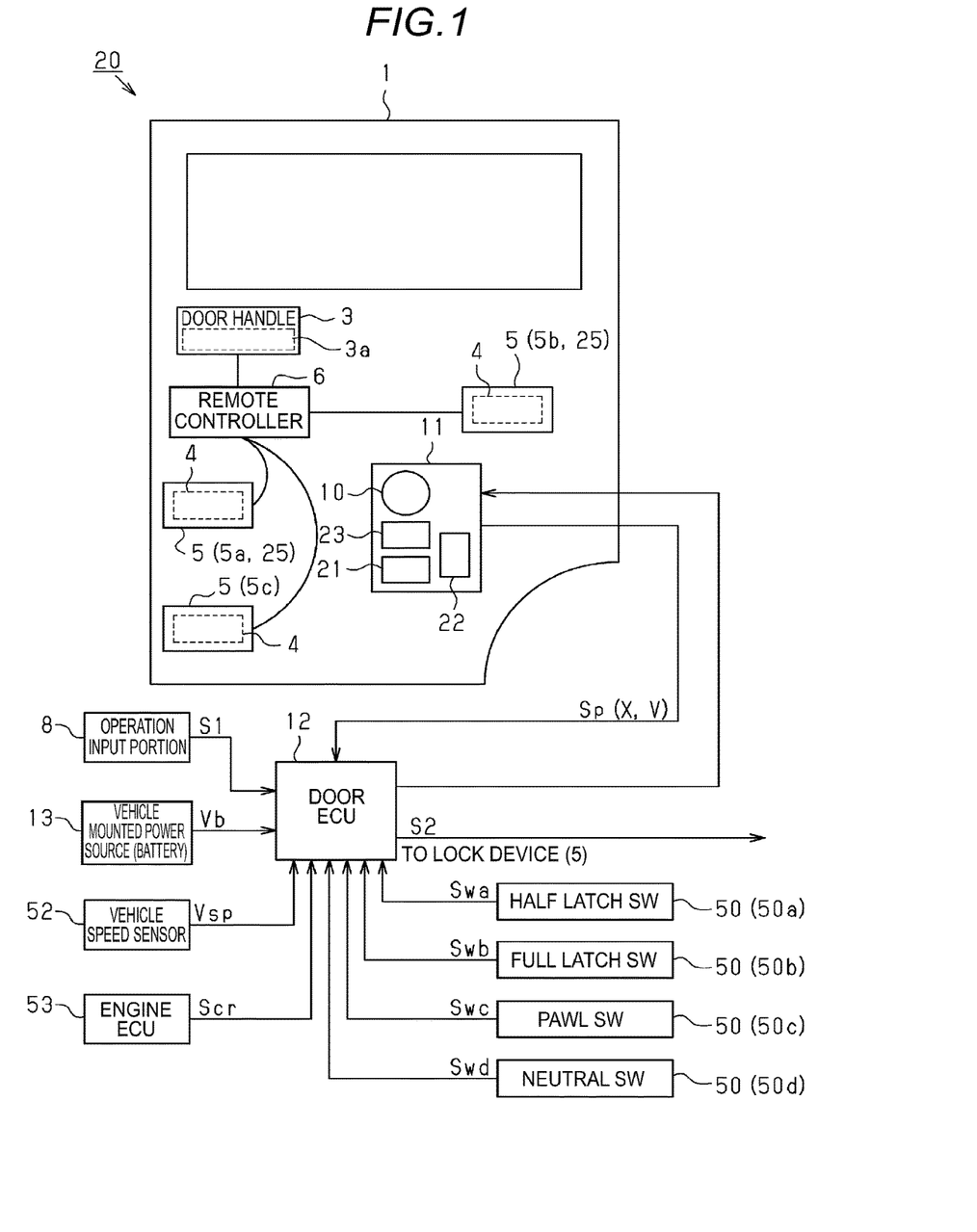
FIG. 1 is a schematic diagram of a configuration of a power slide door apparatus.

As illustrated in FIG. 1, a slide door 1 is supported on a side surface of a vehicle (not illustrated) and moves in a forward and rearward direction to open and close a door opening portion provided on the side surface of the vehicle. Specifically, the slide door 1 is configured so as to be in a full closed state in which the door opening portion is closed by be moved to a vehicle front side (left side in the same drawing), and in a full opened state in which an occupant can get on or off a vehicle via the door opening portion by being moved to a vehicle rear side (right side in the same drawing). The slide door 1 is provided with a door handle 3 for opening and closing the slide door 1.

In addition, the slide door 1 is provided with a plurality of lock devices 5 having latch mechanisms 4 engaging with strikers (not illustrated) provided on a vehicle side according to a moving position of the slide door 1. Specifically, the slide door 1 is provided with a front lock 5a and a rear lock 5b as full closed locks which hold the slide door 1 at a full closed position. Furthermore, the slide door 1 is provided with a full open lock 5c for holding the slide door 1 at a full opened position. The lock devices 5 are connected to the door handle 3 via a remote controller 6.

That is, the slide door 1 of the embodiment is configured such that an engagement state of the latch mechanism 4 configuring each of the lock devices 5 is released by operating operation portions (outer handle and inner handle) 3a of the door handle 3. With the door handle 3 as a gripping portion, it is possible to manually open and close the door.

In addition, the slide door 1 of the embodiment is configured such that the engagement state of the latch mechanism 4 configuring the lock device 5 is capable of being released also by operating an operation switch provided in a passenger compartment or an operation input portion 8 of a portable device by an occupant. Furthermore, the slide door 1 of the embodiment is provided with a door actuator 11 of which a drive source is a motor 10 and a door ECU 12 that controls an operation of the door actuator 11 through a supply of a drive power to the motor 10. That is, the door ECU 12 of the embodiment generates the drive power supplied to the motor 10 of the door actuator 11 based on a power source voltage Vb of a vehicle-mounted power source (battery) 13. Therefore, in the vehicle of the embodiment, a power slide door apparatus 20 capable of causing the slide door 1 to perform an opening and closing operation based on the driving force of the motor 10 is formed.

More specifically, an operation input signal S1 indicating that the operation input portion 8 provided in the door handle 3, the passenger compartment, the portable device, or the like is operated is input into the door ECU 12 of the embodiment. That is, the door ECU 12 of the embodiment detects an opening and closing operation request of the slide door 1 by a user based on the operation input signal S1. The operation of the door actuator 11 is controlled so as to move the slide door 1 in a requested opening and closing operation direction.

More specifically, the door actuator 11 of the embodiment includes an opening and closing drive portion 21 capable of driving the opening and closing of the slide door 1 via a drive cable (not illustrated) by being rotated based on the driving force of the motor 10. In addition, the door actuator 11 is provided with a pulse sensor 22 outputting a pulse signal Sp in synchronization with the operation of the opening and closing drive portion 21. The door ECU 12 of the embodiment is configured to control the operation of the door actuator 11 based on a moving position X and a moving speed V of the slide door 1 detected by counting the pulse signal Sp, or the like.

In addition, the door actuator 11 of the embodiment is provided with an electromagnetic clutch 23 capable of connecting and disconnecting a torque transmission path between the motor 10 and the opening and closing drive portion 21. For example, the electromagnetic clutch 23 is controlled so as to cut the torque transmission path in a case where the slide door 1 is manually opened and closed. Therefore, the power slide door apparatus 20 of the embodiment is configured such that the slide door 1 smoothly performs the opening and closing operation even during the manual operation.

Furthermore, the door ECU 12 of the embodiment controls the operation of each of the lock devices 5 through an output of a lock control signal S2. Specifically, in a case where the slide door 1 at the full opened position or the full closed position performs the opening and closing operation, before the drive control of the slide door 1 is started, in order to release the latch mechanism 4 in the engagement state, the operation of the lock device 5 is controlled (release control). In a case where the latch mechanism 4 of the lock device 5 is in a half latch state during executing the drive control of the slide door 1, the operation of the lock device 5 is controlled so that the latch mechanism 4 is shifted to a full latch state (close control).

Lock Device

Next, the lock devices 5 provided in the power slide door apparatus 20 of the embodiment, specifically, a configuration of lock devices 25 constituting the full closed locks (front lock 5a and the rear lock 5b) will be described.

Figure 2:
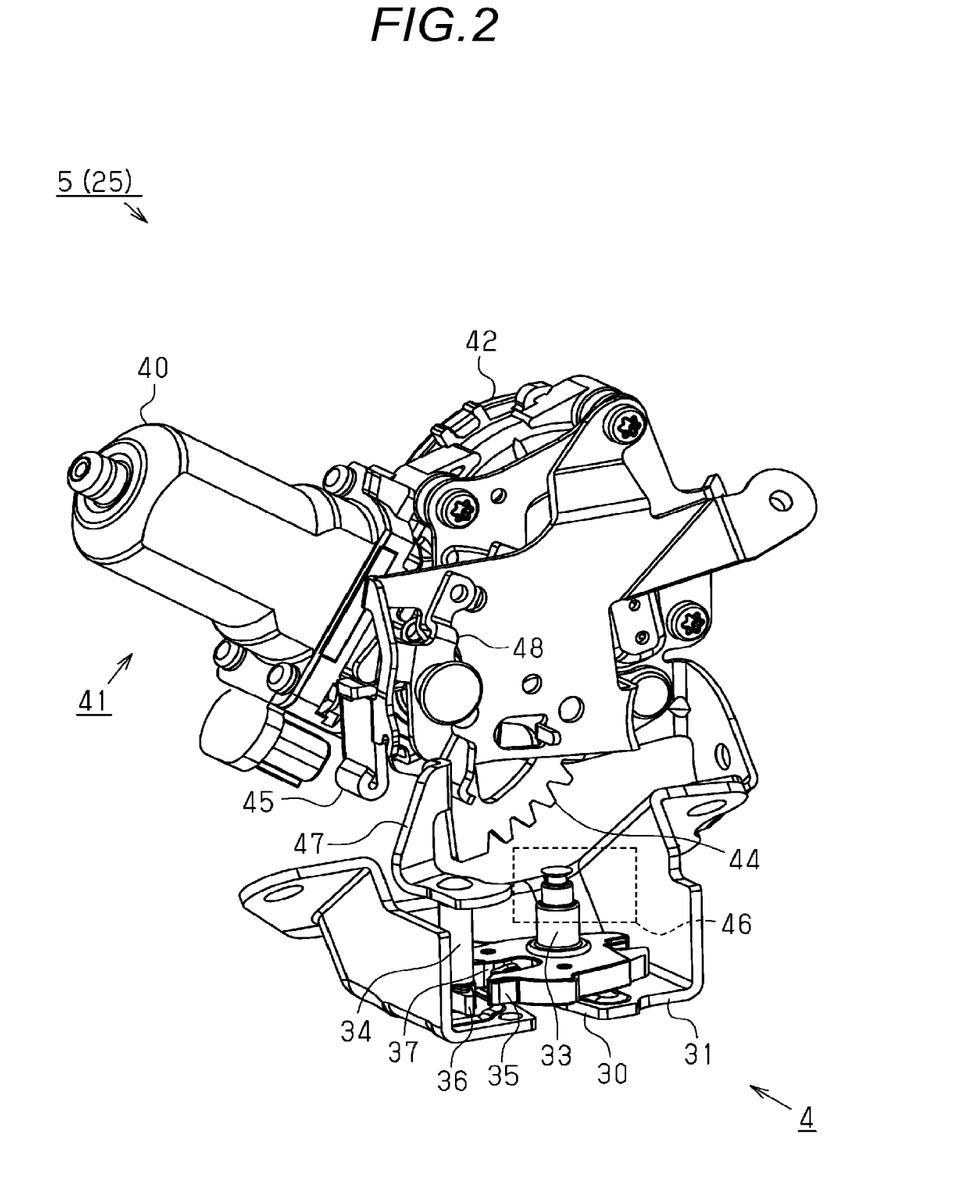
FIG. 2 is a perspective view illustrating a schematic configuration of a lock device.
Figure 3:
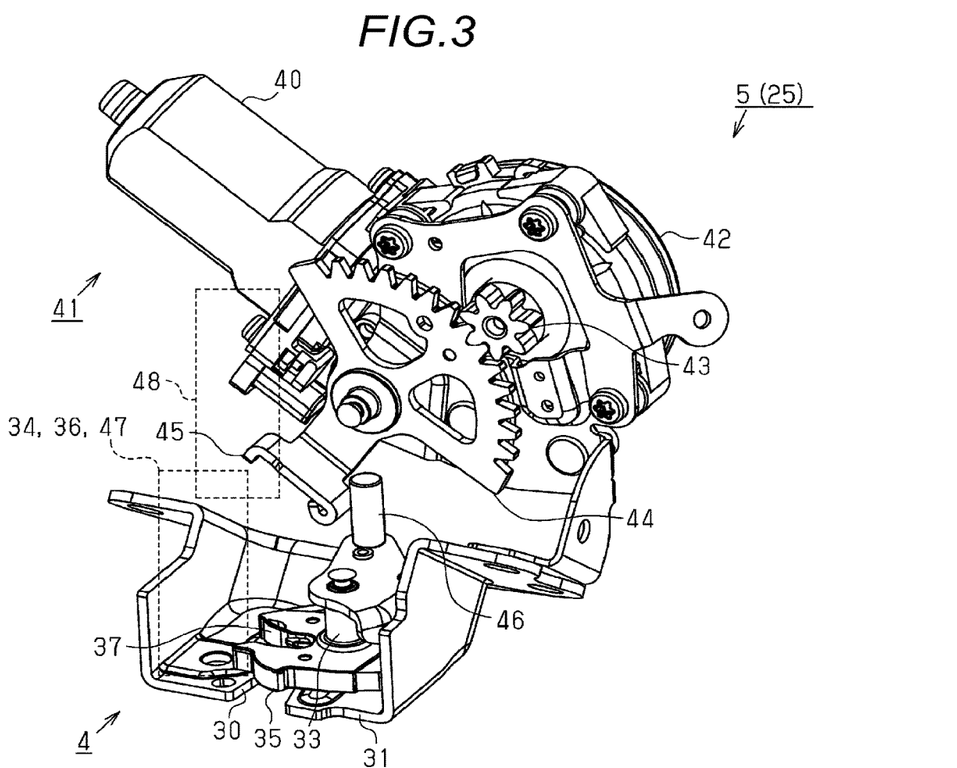
FIG. 3 is a perspective view illustrating a schematic configuration of the lock device.

As illustrated in FIGS. 2 and 3, the lock device 25 (5) of the embodiment includes a base plate 31 having a slit-like striker inlet and outlet groove 30. In addition, on the base plate 31, two support shafts 33 and 34 are erected at positions with the striker inlet and outlet groove 30 being interposed therebetween in a groove width direction (rightward and leftward direction in each drawing). The latch mechanism 4 of the embodiment includes a latch 35 and a pawl 36 rotatably pivoted around the support shafts 33 and 34.

Figure 4:
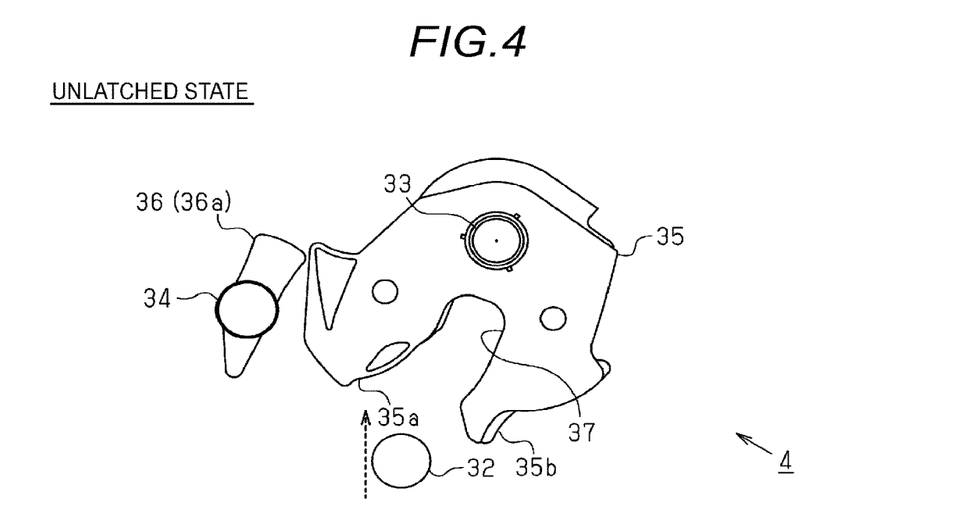
FIG. 4 is a view illustrating a schematic configuration and an operation of a latch mechanism (unlatch state)

As illustrated in FIG. 4, the latch 35 of the embodiment has a substantially flat plate-like outer shape having a striker engagement groove 37 opening on an outer peripheral surface thereof. In addition, the latch 35 is rotatably biased in the counterclockwise direction in FIG. 4 by a torsion coil spring (latch biasing spring) (not illustrated) fitted to the support shaft 33. Furthermore, the latch 35 abuts against a stopper portion (not illustrated) provided in the base plate 31 and thereby a rotation thereof is restricted based on a biasing force of the latch biasing spring at a position in which an opening end of the striker engagement groove 37 faces the striker inlet and outlet groove 30. Therefore, the latch mechanism 4 of the embodiment is configured such that a striker 32 entered the striker inlet and outlet groove 30 engages with the striker engagement groove 37 of the latch 35.

On the other hand, the pawl 36 of the embodiment is rotatably biased in the clockwise direction in FIG. 4 by a torsion coil spring (pawl biasing spring) (not illustrated) fitted to the support shaft 34. In addition, the pawl 36 is provided with an engagement portion 36a which moves in a direction approaching the outer peripheral surface of the latch 35 by a rotation based on a biasing force of the pawl biasing spring. Furthermore, the pawl 36 is configured so that the engagement portion 36a engages with the outer peripheral surface of the latch 35 in a state where the striker 32 engages with the striker engagement groove 37. Therefore, the latch mechanism 4 of the embodiment is capable of holding a state where the striker 32 engages with the striker engagement groove 37 of the latch 35.

Figure 5:
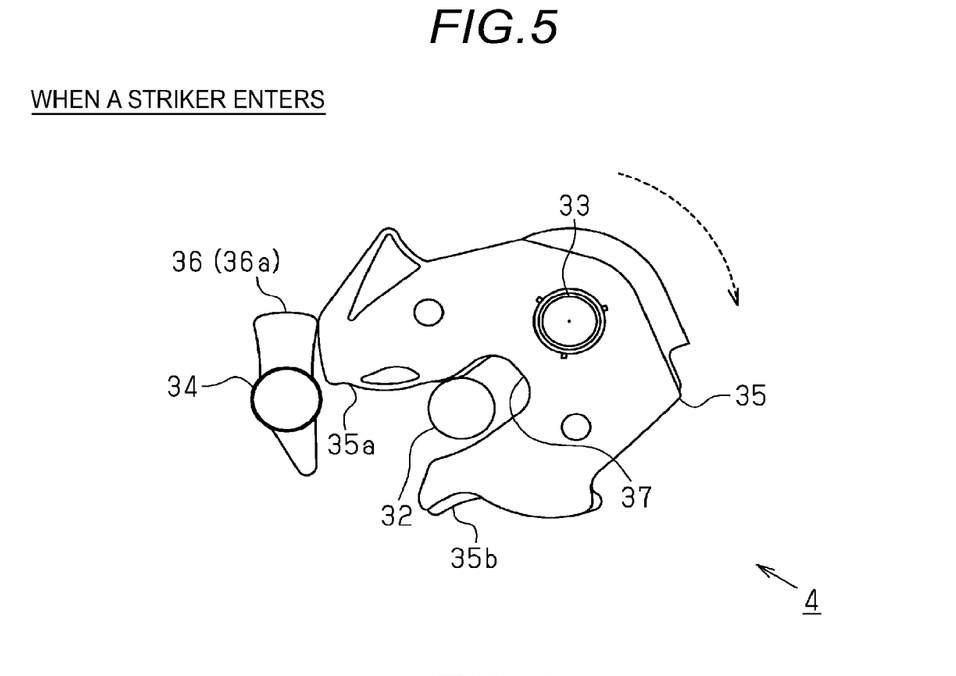
FIG. 5 is a view illustrating a schematic configuration and an operation of the latch mechanism (when a striker enters)
Figure 6:
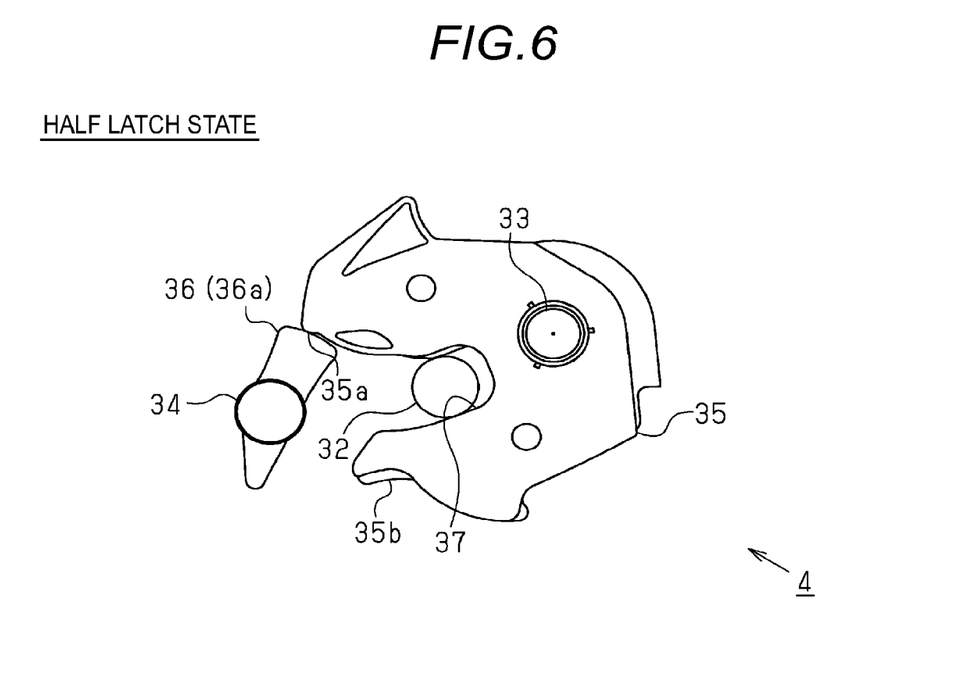
FIG. 6 is a view illustrating a schematic configuration and an operation of the latch mechanism (half latch state)

That is, as illustrated in FIGS. 5 and 6, the striker 32 entered the striker inlet and outlet groove 30 engages with the striker engagement groove 37 so as to relatively move inwardly (from a lower side to an upper side in each drawing) inside the striker inlet and outlet groove 30 while pressing the latch 35. Therefore, the latch 35 rotates in the clockwise direction in each drawing against the biasing force of the latch biasing spring.

In addition, in this case, the engagement portion 36a of the pawl 36 slides on the outer peripheral surface of the abutting latch 35 apparently in a state of being pressed against the outer peripheral surface of the latch 35 based on the biasing force of the pawl biasing spring. Therefore, the engagement portion 36a on the pawl 36 side engages with a first engagement portion 35a on the latch 35 side formed on the outer peripheral surface thereof so that the latch mechanism 4 of the embodiment is configured to restrict the rotation of the latch 35.

Specifically, in the embodiment, the first engagement portion 35a on the latch 35 side is set at an opening end of the striker engagement groove 37, specifically, on a side wall surface on a side being pressed by engaging with the striker 32. Therefore, the latch mechanism 4 of the embodiment is configured such that the striker 32 is held in the latch 35 in the engagement state by restricting the rotation thereof in the biasing direction by the latch biasing spring, that is, in a direction in which the striker 32 is discharged from the striker engagement groove 37 (half latch state).

In addition, as illustrated in FIGS. 2 and 3, the lock device 25 of the embodiment is provided with a lock actuator 41 of which a drive source is the motor 40. Specifically, the lock actuator 41 is configured as a so-called geared motor in which a motor 40 and a speed reducer 42 are integrally provided. Furthermore, the lock device 25 of the embodiment is operated by receiving the supply of the drive power based on the power source voltage Vb of the vehicle-mounted power source (battery) 13 from the door ECU 12. As described above, in a case where the latch mechanism 4 is in the half latch state (see FIG. 6), the lock actuator 41 is operated thereby shifting the latch mechanism 4 to the full latch state (close operation).

Figure 7:
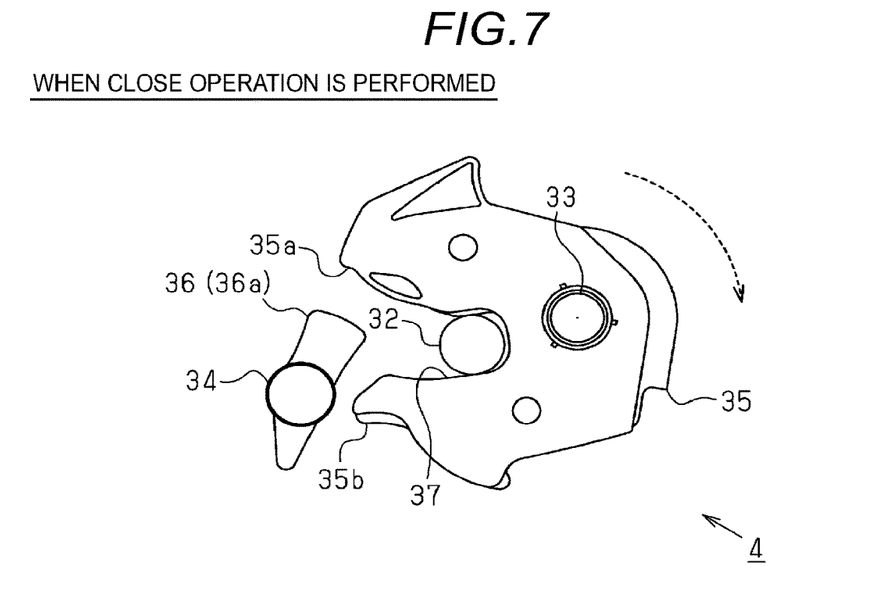
FIG. 7 is a view illustrating a schematic configuration and an operation of the latch mechanism (when a close operation is performed)
Figure 8:
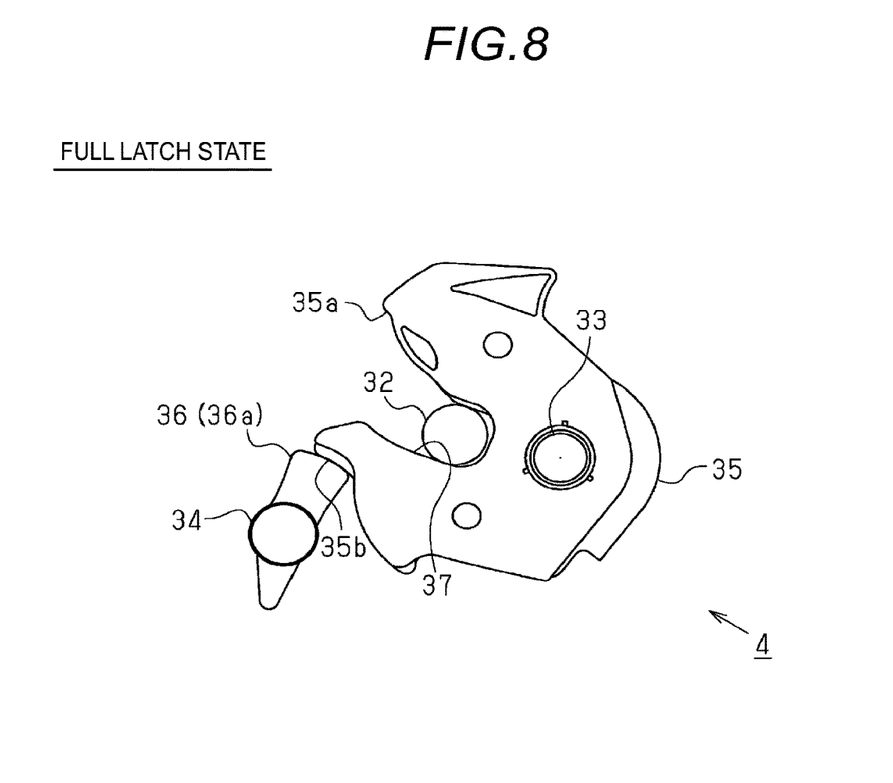
FIG. 8 is a view illustrating a schematic configuration and an operation of the latch mechanism (full latch state)

That is, as illustrated in FIGS. 6 to 8, the latch mechanism 4 of the embodiment is configured such that the latch 35 is rotated by driving the lock actuator 41 in a closing direction (clockwise direction in each drawing) against the biasing force of the latch biasing spring from a rotational position corresponding to the half latch state. In addition, the pawl 36 is configured so as to restrict the rotation of the latch 35 by engaging with a second engagement portion 35b formed on a peripheral surface of the latch 35 at a position at which the latch 35 is rotated in the closing direction based on the biasing force of the latch biasing spring. Therefore, the latch mechanism 4 of the embodiment is configured so as to be shifted to the full latch state in which the striker 32 engaging with the striker engagement groove 37 of the latch 35 is restrained to be relatively immovable.

Furthermore, the lock device 25 of the embodiment is configured such that the lock actuator 41 is operated thereby causing the latch mechanism 4 to perform the release operation, for example, based on an opening operation input to the operation input portion 8 or the like.

Figure 9:
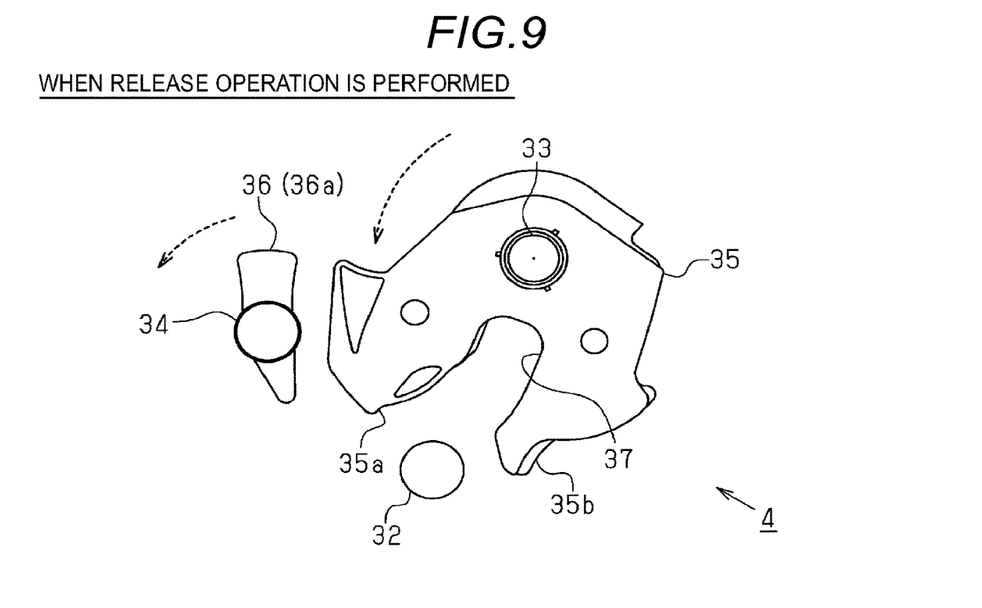
FIG. 9 is a view illustrating a schematic configuration and an operation of the latch mechanism (when a release operation is performed)

That is, as illustrated in FIGS. 8 and 9, the latch mechanism 4 of the embodiment is configured so that the pawl 36 is rotated in the counterclockwise direction in each drawing against the biasing force of the pawl biasing spring by being driven by the lock actuator 41. In addition, the rotation restriction by the engagement with the pawl 36 is released and thereby the latch 35 is rotated in a releasing direction (counterclockwise direction in each drawing) based on the biasing force of the latch biasing spring. Therefore, the latch mechanism 4 of the embodiment is configured such that the restriction of the striker 32 is released and the striker 32 is discharged from the striker engagement groove 37, thereby restoring to the unlock state as illustrated in FIG. 4.

More specifically, as illustrated in FIGS. 2 and 3, the lock actuator 41 of the embodiment outputs the rotation of the motor 40 decelerated by the speed reducer 42 with a pinion gear 43 as an output portion. In addition, the lock device 25 of the embodiment includes a sector gear 44 meshing with the pinion gear 43. Furthermore, the sector gear 44 is provided with an active lever 45 which integrally rotates with the sector gear 44. The lock device 25 of the embodiment is configured such that the latch mechanism 4 performs the close operation and the release operation according to the rotating direction of the active lever 45.

Figure 10:
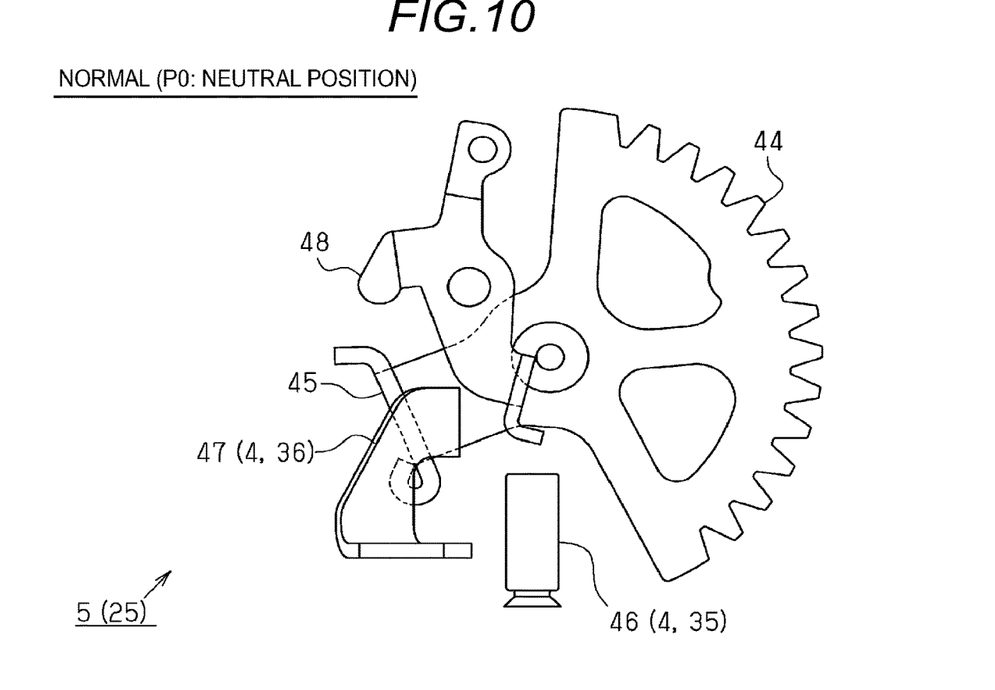
FIG. 10 is a view illustrating an operation of the lock device (normal: a neutral position)
Figure 11:
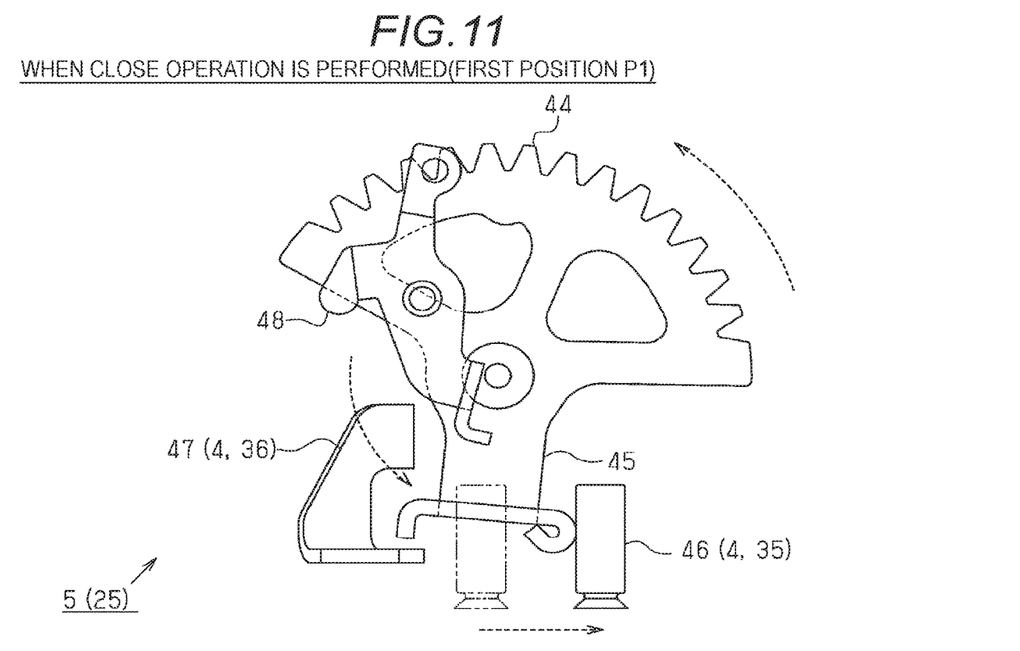
FIG. 11 is a view illustrating an operation of the lock device (when the close operation is performed)
Figure 12:
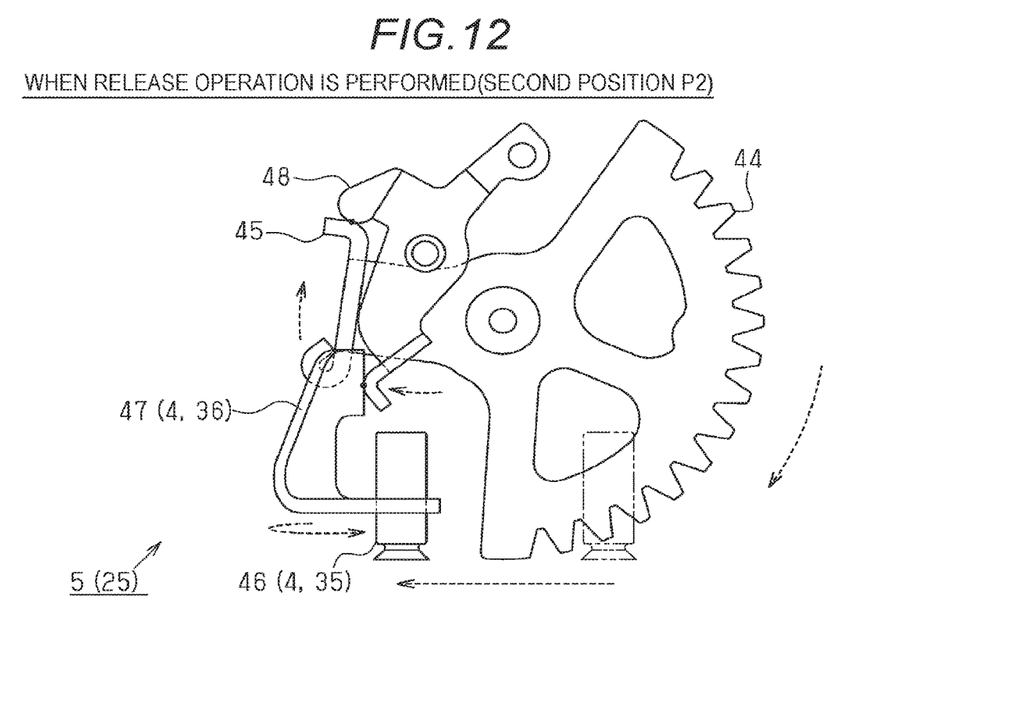
FIG. 12 is a view illustrating an operation of the lock device (when the release operation is performed)

That is, as illustrated in FIGS. 10 to 12, the active lever 45 as a rotation member rotates in a first direction (counterclockwise direction in each drawing) and a second direction (clockwise direction in each drawing) based on the driving force of the lock actuator 41. In addition, the lock device 25 of the embodiment is configured such that when the active lever 45 rotates from a neutral position P0 (see FIG. 10) in the first direction and the active lever 45 rotates to the first position P1, the close operation of the latch mechanism 4 is completed (see FIG. 11). When the active lever 45 rotates from the neutral position P0 in the second direction and the active lever 45 rotates to the second position P2, the release operation of the latch mechanism 4 is completed (see FIG. 12).

Specifically, as illustrated in FIG. 3, the latch mechanism 4 of the embodiment includes a latch lever 46 integrally rotating with the latch 35. In addition, as illustrated in FIGS. 10 and 11, the active lever 45 of the embodiment is configured so as to press the latch lever 46 by rotating from the neutral position P0 in the first direction. Therefore, the lock device 25 of the embodiment is configured such that the latch mechanism 4 performs the close operation (see FIGS. 6 to 8).

In addition, as illustrated in FIG. 2, the latch mechanism 4 of the embodiment includes a release lever 47 integrally rotating with the pawl 36. Furthermore, as illustrated in FIGS. 10 to 12, the active lever 45 of the embodiment is configured so as to press the release lever 47 via an open lever 48 by rotating from the neutral position P0 in the second direction. Therefore, the lock device 25 of the embodiment is configured such that the latch mechanism 4 performs the release operation (see FIGS. 8 and 9).

Furthermore, in the lock device 25 of the embodiment, after the close operation and the release operation are completed as described above, the lock actuator 41 is operated and thereby the active lever 45 returns to the neutral position P0. Therefore, it is configured to prepare the next close operation and the release operation. That is, returning of the active lever 45 to the neutral position P0 indicates that the operation of the latch mechanism 4 is initialized.

More specifically, as illustrated in FIG. 1, the door ECU 12 as a control device for controlling the operation of the lock device 25 is connected to a half latch SW 50*a*, a full latch SW 50*b*, a pawl SW 50*c*, and a neutral SW 50*d* provided in the lock device 25. That is, the door ECU 12 of the embodiment detects operation states of the latch mechanism 4 provided in the lock device 25 specifically, the half latch state, the full latch state, and the release state, and whether the active lever 45 is at the neutral position P0 based on output signals Swa to Swd of sensor switches 50 (50*a* to 50*d*) respectively. Therefore, it is configured that the operation of the lock actuator 41 provided in the lock device 25 is controlled so that the latch mechanism 4 performs the close operation and the release operation.

Interruption and Restart Control When Power Source Voltage is Lowered

Next, interruption and restart control when the power source voltage executed by the door ECU 12 of the embodiment is lowered will be described.

The door ECU 12 of the embodiment monitors the power source voltage Vb of the vehicle-mounted power source (battery) 13. Furthermore, the door ECU 12 stops the drive control of the slide door 1 in a case where the power source voltage Vb of the vehicle-mounted power source 13 is lowered by cranking of an engine (not illustrated) or the like. The drive control of the slide door 1 is restarted after waiting for recovery of the lowered power source voltage Vb.

That is, the door ECU 12 of the embodiment reserves the opening and closing drive of the slide door 1 when the power source voltage Vb is lowered in which the supply of the drive power is likely to be unstable. After the lowered power source voltage Vb is recovered, the opening and closing drive of the slide door 1 requested by the user is completed.

Furthermore, in such a case, the door ECU 12 of the embodiment interrupts the operation control even in a case where the operation of the lock device 25 (5*a* and 5*b*) configuring the full closed lock for holding the slide door 1 at the full closed position is controlled. Also in this case, after the start of the lowered power source voltage Vb, the operation control of the lock device 25 is restarted.

More specifically, the door ECU 12 of the embodiment stops the close control, for example, in a case where it is detected that the power source voltage Vb is lowered during executing the close control causing the latch mechanism 4 to perform the close operation. After the lowered power source voltage Vb is recovered and the operation control of the lock device 25 is capable of restarting, control contents executing after the stop of the close control are selected.

Figure 13:
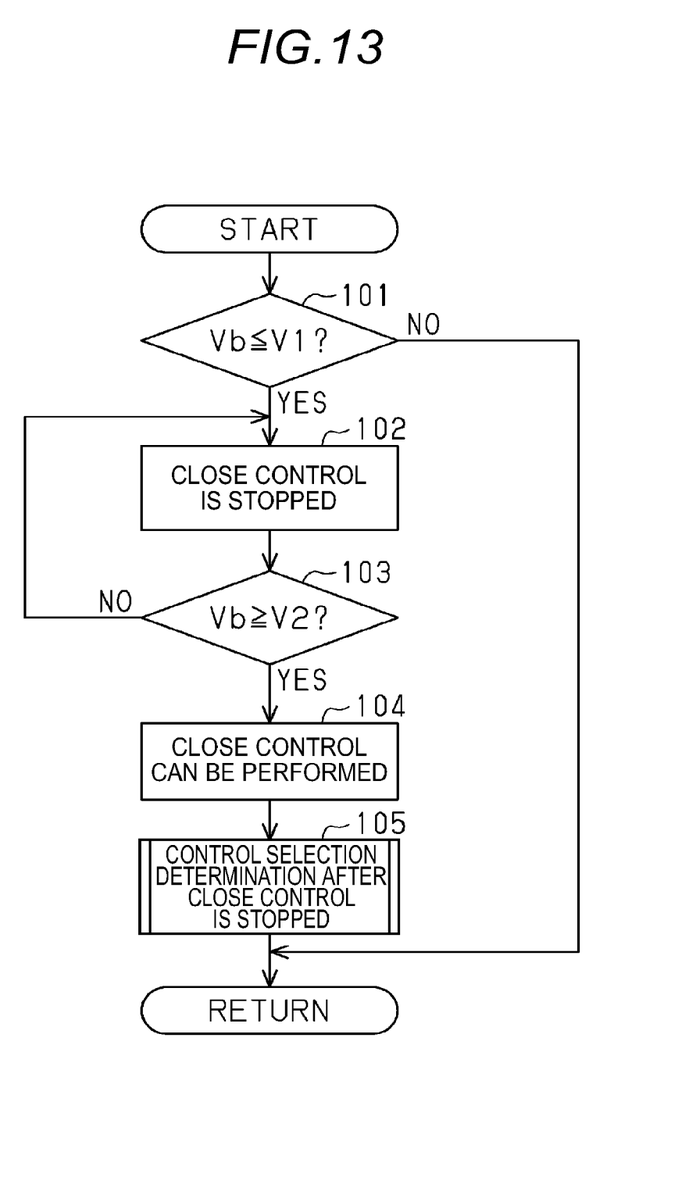
FIG. 13 is a flowchart illustrating a processing procedure of an executing permission control by stopping the close control by lowering of a power source voltage and recovering of the power source voltage.

Specifically, as illustrated in a flowchart of FIG. 13, the door ECU 12 determines whether or not the power source voltage Vb of the vehicle-mounted power source 13 is a first threshold V1 or less during execution of the close control (see FIGS. 10 and 11) (step 101). In a case where the power source voltage Vb is the first threshold V1 or less (Vb≤V1, step 101: YES), the close control is stopped (step 102).

Furthermore, the door ECU 12 determines whether or not the power source voltage Vb is a second threshold V2 or more after the stop of the close control (step 103) and in a case where the power source voltage Vb is the second threshold V2 or more (Vb≥V2, step 103: YES), it is determined that the execution of the close control can be performed (step 104). A selection determination of the control contents executing after the stop of the close control is executed (control selection determination, step 105).

Figure 14:
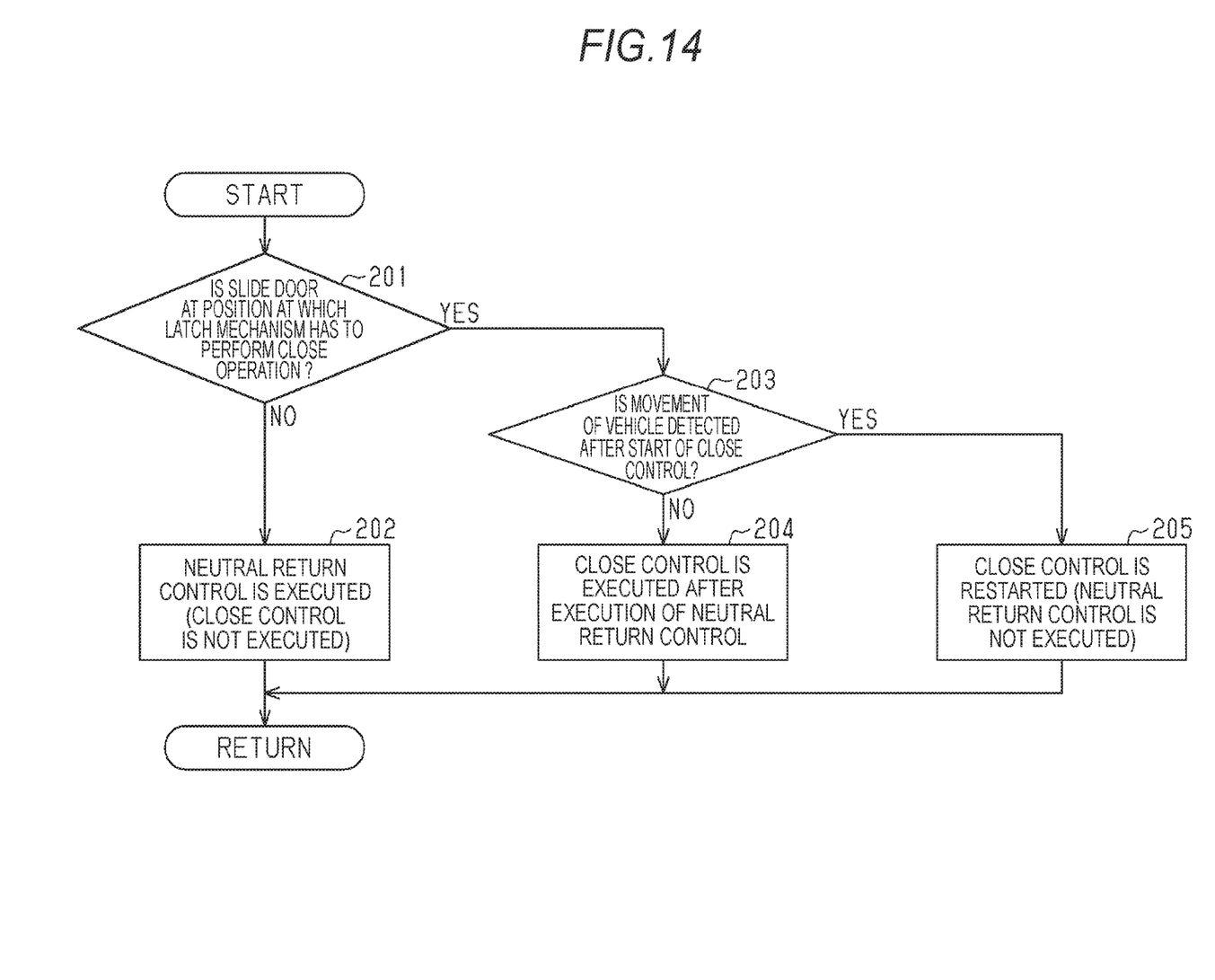
FIG. 14 is a flowchart illustrating a processing procedure of a control selection determination after a stop of the close control.

More specifically, as illustrated in a flowchart of FIG. 14, the door ECU 12 of the embodiment firstly determines whether or not the slide door 1 having the lock device 25 is at a position at which the latch mechanism 4 has to perform the close operation in the control selection determination after the stop of the close control (step 201).

In addition, the lock device 25 of the embodiment is configured such that the half latch SW 50*a* and the full latch SW 50*b* are turned on together in a case where the latch mechanism 4 is in a state from the unlatched state (see FIG. 4) to the half latch state (see FIG. 6). In addition, the lock device 25 is configured such that the half latch SW 50*a* is turned off and the full latch SW 50*b* is turned on in a case where the latch mechanism 4 is in a state from the half latch state to the full latch state (see FIG. 8). Furthermore, the lock device 25 is configured such that the half latch SW 50*a* and the full latch SW 50*b* are turned off together in a case where the latch mechanism 4 is in the full latch state. The door ECU 12 of the embodiment is configured such that the slide door 1 is in a "half door state" in a case where the half latch SW 50*a* is turned off and the full latch SW 50*b* is turned on. In a case of the "half door state", the slide door 1 is held in the fully closed lock and is positioned at the fully closed position. In a case where the slide door 1 is in the "half door state", it is determined that the slide door 1 is at a position at which the latch mechanism 4 has to perform the close operation.

Furthermore, the door ECU 12 executes the neutral control of the active lever 45 in a case where, in step 201, it is determined that the slide door 1 is not positioned at a position at which the latch mechanism 4 has to perform the close operation (step 201: NO) (step 202). After the execution of the neutral control, the execution of the close control is prohibited. That is, in this case, even after the execution of the neutral control, the slide door 1 does not execute the close control of the latch mechanism 4 until the slide door 1 is moved to a position at which the latch mechanism 4 has to perform the close operation.

In addition, the door ECU 12 of the embodiment continuously determines whether or not the movement of the vehicle is detected during a period from beginning when starting the stopped close control until the control selection determination is executed in a case where, in step 201, it is determined that the slide door 1 is at a position at which the latch mechanism 4 has to perform the close operation (step 201: YES) (step 203). Specifically, the door ECU 12 of the embodiment detects the movement of the vehicle based on an output signal Vsp of a vehicle speed sensor 52. Furthermore, the door ECU 12 executes the close control of the latch mechanism 4 after executing the neutral control of the active lever 45 in a case where, in step 203, it is determined that the movement of the vehicle is not detected (step 203: NO) (step 204). In step 203, in a case where it is determined that the movement of the vehicle is detected (step 203: YES), the close control of the latch mechanism 4 is executed without executing the neutral control of the active lever 45 (step 205).

That is, while the close control is stopped, when the execution of the close control can be performed by recovery of the power source voltage Vb, the user manually operates the slide door 1 and thereby the slide door 1 may be in the opened state. Under such a circumstance, in a case where the stopped close control on the way is restarted, when the slide door 1 moves to the position at which the latch mechanism 4 has to perform the close operation, the latch mechanism 4 which performs the close operation interferes with the striker 32.

In view of this point, the door ECU 12 of the embodiment is configured such that it is determined whether or not the slide door 1 is at the position at which the latch mechanism 4 has to perform the close operation in a case where the execution of the close control can be performed again after the stop of the close control on the way. In a case where the slide door 1 is not at the position at which the latch mechanism 4 has to perform the close operation, the active lever 45 of the lock device 25 is returned to the neutral position P0 by the execution of the neutral control and the close operation of the latch mechanism 4 is initialized so that the latch mechanism 4 holds a state of capable of engaging with the striker 32.

In a case where the execution of the close control can be performed again after the stop of the close control on the way, it is estimated that the engagement state of the lock device 25 is not changed in a case where the slide door 1 is at the position at which the latch mechanism 4 has to perform the close operation. In this case, the active lever 45 of the lock device 25 is once returned to the neutral position P0. Therefore, after the close operation of the latch mechanism 4 is initialized, the close control is executed again. Therefore, it is possible to shift further reliably the latch mechanism 4 to the full latch state.

However, the lock device 25 of the embodiment is configured such that the latch mechanism 4 has a configuration to perform the close operation and the release operation according to the rotating direction of the active lever 45. Therefore, there is a possibility that the latch mechanism 4 performs the release operation in a case where the active lever 45 reversely rotates beyond the neutral position P0 due to occurrence of failure when executing the neutral control.

Based on this point, the door ECU 12 of the embodiment determines whether or not traveling of the vehicle is detected from when starting the stopped close control until the control selection determination is executed. In a case where moving of the vehicle is detected, that is, in a case where the vehicle is traveling, the close control stopped on the way is restarted without executing the neutral control. Therefore, the possibility that the latch mechanism 4 performs the release operation, that is, the slide door 1 is in the opened state during traveling of the vehicle is eliminated.

Above, according to the embodiment, the following effects can be obtained.

(1) The door ECU 12 as the neutral control portion causes the active lever 45 as the rotation member, which causes the latch mechanism 4 to perform the close operation and the release operation according to the rotating direction, to return to the neutral position P0 in a case where the execution of the close control can be performed after the stop of the close control of the latch mechanism 4 on the way. In addition, the door ECU 12 as the vehicle state detection portion detects the movement of the vehicle after the start of the close control. In a case where it is determined that the movement of the vehicle is detected (step 203: YES) after the start of the close control, the door ECU 12 as the restart control portion restarts the close control that is stopped on the way without executing the neutral control of the active lever 45 in a case where the execution of the close control can be performed (step 205).

According to the configuration, the active lever 45 rotates in the second direction beyond the neutral position P0 due to occurrence of failure and thereby the possibility that the latch mechanism 4 performs the release operation can be excluded. Therefore, it is possible to complete the close operation of the latch mechanism 4 while preventing the slide door 1 from being in an opened state during traveling of the vehicle. As a result, even in a case where the close control is stopped on the way, the lock device 25 can correctly function.

(2) The door ECU 12 as the retry control portion executes the close control again after executing the neutral control in a case where the movement of the vehicle is not detected after the start of the close control (step 203: NO) (step 204).

That is, after the close operation of the latch mechanism 4 is initialized, the close control is executed again. Therefore, it is possible to shift further reliably the latch mechanism 4 to the full latch state. In a case where the vehicle is stopped, a possibility that the slide door 1 is temporarily in the opened state is also not a problem. Therefore, According to the configuration, it is possible to reliably close the lock device 25 while securing high safety.

(3) The door ECU 12 as the closed position determination portion and the close prohibition portion determines whether or not the slide door 1 is at the position at which the latch mechanism 4 has to perform the close operation in a case where the execution of the close control can be performed. In a case where the slide door 1 is not at the position at which the latch mechanism 4 has to perform the close operation (step 201: NO), only the neutral control is executed and then the close control is not executed.

According to the configuration, when the slide door 1 moves to the position at which the latch mechanism 4 has to perform the close operation, it is possible to prevent the latch mechanism 4 performing the close operation from interfering with the striker 32. The close operation of the latch mechanism 4 is initialized by the execution of the neutral control, the state is maintained, and thereby the lock device 25 can correctly function.

(4) The lock device 5 (25) receives the supply of drive power based on the power source voltage Vb of the vehicle-mounted power source 13. The door ECU 12 as the stop control portion and the execution permission portion stops the operation control of the lock device 5 (step 102) when the power source voltage Vb is lowered (Vb≤V1, step 101: YES) and permits the execution of the operation control (step 104) in a case where the power source voltage Vb is recovered (Vb≥V2, step 103: YES).

According to the configuration, it is possible to prevent the operation control of the lock device 5 from being performed under the situation where the supply of the drive power is likely to be unstable and the power source voltage Vb is lowered. Therefore, a high texture can be secured.

Moreover, the embodiment may be changed as follows.

In the embodiment, the slide door 1 provided on the side surface of the vehicle is embodied in the power slide door apparatus 20 and the lock device 5 (25) causing the slide door 1 to perform the opening and closing operation. However, the disclosure is not limited thereto and may be applied to another power door device such as a swing type door, a rear door and a luggage door provided at a rear portion of a vehicle. The disclosure may be applied to an opening and closing body control apparatus for a vehicle intended for an opening and closing body such as a sunroof apparatus or a power window apparatus other than the door.

The number and arrangement of the lock devices 5 provided in the slide door 1 may be arbitrary changed.

In the embodiment, the lock device 25 includes the active lever 45 rotated in the first direction and the second direction by the drive of the motor. The latch mechanism 4 performs the close operation and the release operation according to the rotating direction of the active lever 45. However, the disclosure is not limited thereto and the configuration of the rotation member, which causes the latch mechanism 4 to perform the close operation and the release operation by being rotated in the first direction and the second direction, may be arbitrary changed.

In the embodiment, the drive control of the slide door 1 and the operation control of the lock device 25 are stopped, and the execution of the drive control of the stopped slide door 1 and the operation control of the lock device 25 are permitted by directly monitoring (detecting) the power source voltage Vb of the vehicle-mounted power source 13. However, the disclosure is not limited thereto and a cranking signal Scr indicating that cranking of the engine is performed is obtained from an engine ECU 53 (see FIG. 1). It may be configured to permit the execution of the drive control of the slide door 1 and the operation control of the lock device 25 after the drive control of the slide door 1 and the operation control of the lock device 25 are stopped when starting cranking where the power source voltage Vb tends to decrease, and the completion of cranking that the power source voltage Vb is supposed to recover.

In addition, It may be configured to stop the drive control of the slide door 1 and the operation control of the lock device 25, and permit the execution thereof based on an event other than the cranking that may cause the power source voltage Vb of the vehicle-mounted power source 13 to be lowered.

In the embodiment, the movement of the vehicle is detected after the start of the close control. In a case where the movement of the vehicle is detected after the start of the close control, the close control which is stopped on the way is restarted without executing the neutral control causing the active lever 45 to return to the neutral position P0 in a case where the execution of the close control can be performed. However, the disclosure is not limited thereto and it may be configured to restart the close control without executing the neutral control in a case where the vehicle is moving at time point the close control can be performed. Therefore, it is possible to further reliably prevent the slide door 1 from being in the opened state during traveling of the vehicle.

In addition, also in a configuration in which the lock device 25 does not have the rotation member causing the latch mechanism 4 to perform the close operation and the release operation according to the rotating direction, that is, in a lock device in which a close mechanism and a release mechanism are independently provided, the close operation of the latch mechanism 4 may be initialized in a case where the close control can be performed after the stop of the close control on the way. Therefore, thereafter, in a case where the close control is executed again, it is possible to further reliably shift the latch mechanism 4 to the full latch state. Also in this case, it is possible to prevent the latch mechanism 4 performing the close operation from interfering with the striker 32 by executing the close control again, after confirming that the slide door 1 is at the position at which the latch mechanism 4 has to perform the close operation.

In the embodiment, in the lock device 25, the neutral SW 50*d* capable of detecting that the active lever 45 is at the neutral position P0 is provided. However, the disclosure is not limited thereto and it may be configured to perform the neutral position return determination of the active lever 45 based on a count value of a counter that counts up by continuing the neutral control. For the counter, a time counter (timer) may also be used. For example, a counter that counts up in synchronization with the rotation of the motor 40 that is the drive source, that is, the reverse rotation of the active lever 45 may be used.

In the embodiment and another example, the door ECU 12 as the control device controls the operation of the lock device 25. The door ECU 12 has functions as the neutral control portion, the vehicle state detection portion, the restart control portion, the retry control portion, the closed position determination portion, the close prohibition portion, the stop control portion, the execution permission portion, and the initialization control portion. However, the disclosure is not limited thereto and a configuration, in which such a control device is formed in a distributed manner in a plurality of information processing devices, may be provided. Each of function control portions may also be distributed among these information processing devices.

Next, technical ideas which can be grasped from the embodiments will be described together with effects.

It is preferable that an opening and closing body control apparatus for a vehicle according to an aspect of this disclosure includes a lock device that has a latch mechanism; and a control device that controls an operation of the lock device, the lock device has a rotation member rotating in a first direction and a second direction, and the latch mechanism performs a close operation and a release operation according to a rotating direction of the rotation member, the control device executes a close control for rotating the rotation member from a neutral position to a first position in the first direction in order to cause the latch mechanism to perform the close operation, and the control device includes a neutral control portion that reversely rotates the rotation member to the neutral position in a case where the close control becomes possible to be performed after the stop of the close control on the way, a vehicle state detection portion that detects moving of a vehicle after a start of the close control, and a restart control portion that restarts the close control without executing a neutral control for rotating the rotation member to the neutral position when the close control becomes possible to be performed after the stop of the close control on the way, in a case where moving of the vehicle is detected after the lock device holds the opening and closing body at a fully closed position and the close control is started.

According to this configuration, the rotation member reversely rotates beyond the neutral position due to occurrence of a failure or the like and thereby a possibility that the latch mechanism performs a release operation by reversely rotating can be eliminated. Therefore, it is possible to complete the close operation of the latch mechanism while preventing the opening and closing body from being in an opened state during traveling of the vehicle. As a result, even in a case where the close control is stopped on the way, the lock device can correctly function.

In the opening and closing body control apparatus for a vehicle, it is preferable that the restart control portion restarts the close control without executing the neutral control in a case where moving of the vehicle is detected when the close control becomes possible to be performed.

According to this configuration, it is possible to further reliably prevent the opening and closing body from being in the opened state during traveling of the vehicle.

In the opening and closing body control apparatus for a vehicle, it is preferable that the control device includes a retry control portion that executes the close control again after the neutral control is executed in a case where moving of the vehicle is not detected after start of the close control.

That is, the close control is executed again after the close operation of the latch mechanism is initialized and thereby the latch mechanism can be further reliably shifted to a full latch state. In a case where the vehicle is stopped, a possibility that the opening and closing body is temporarily in the opened state is also not a problem. Therefore, according to the configuration, it is possible to reliably close the lock device while securing high safety.

In the opening and closing body control apparatus for a vehicle, it is preferable that the control device includes a closed position determination portion that determines whether or not the opening and closing body is positioned at a position at which the latch mechanism has to perform the close operation in a case where the close control becomes possible to be performed, and a close prohibition portion that prohibits execution of the close control in a case where the opening and closing body is not positioned at a position at which the latch mechanism has to perform the close operation.

According to this configuration, when the opening and closing body moves to the position at which the latch mechanism has to perform the close operation, it is possible to prevent the latch mechanism performing the close operation from interfering with a striker. The close operation of the latch mechanism is initialized by the execution of the neutral control, the state is maintained, and thereby the lock device can correctly function.

In the opening and closing body control apparatus for a vehicle, it is preferable that the lock device receives a supply of drive power for driving the lock device by a power source voltage of a vehicle-mounted power source, and the control device includes a stop control portion that stops an operation control of the lock device when the power source voltage is lowered, and an execution permission portion that permits the execution of the operation control in a case where the power source voltage is recovered.

According to this configuration, it is possible to prevent an operation control of the lock device from being performed under a situation where the supply of the drive power is likely to be unstable and the power source voltage is lowered. Therefore, a high texture can be secured.

In the opening and closing body control apparatus for a vehicle, it is preferable that the stop control portion stops the operation control of the lock device in a case where cranking of an engine is started, and the execution permission portion permits the execution of the operation control in a case where the cranking is completed.

That is, during cranking of the engine, the starter consumes a large amount of power so that the power source voltage of the vehicle-mounted power source is temporarily lowered. Therefore, according to the configuration, it is possible to prevent the operation control of the lock device from being performed under the situation where the supply of the drive power is likely to be unstable and the power source voltage is lowered. In addition, particularly, in a compact car or the like having a small capacity of the vehicle-mounted power source, it is possible to promptly start the engine by concentrating the output of the vehicle-mounted power source to the starter. Therefore, it is possible to prevent overdischarging of the vehicle-mounted power source by suppressing power consumption.

In the opening and closing body control apparatus for a vehicle, it is preferable that the lock device has a half latch switch and a full latch switch which detect a state of the operation of the latch mechanism, the control device detects the state of the operation of the latch mechanism from ON and OFF states of the half latch switch and the full latch switch, and the opening and closing body is in a half door state in a case where the half latch switch is in the OFF state and the full latch switch is in the ON state, and the restart control portion restarts the close control without executing the neutral control for rotating the rotation member to the neutral position when the close control becomes possible to be performed after a stop of the close control on the way in a case where moving of the vehicle is detected after the opening and closing body is in the half door state and the close control is started.

It is preferable that an opening and closing body control apparatus for a vehicle according to another aspect of this disclosure includes a lock device that has a latch mechanism; and a control device that controls an operation of the lock device, the lock device has a rotation member rotating in a first direction and a second direction from a neutral position, and the latch mechanism performs a close operation and a release operation according to a rotating direction of the rotation member, the control device executes a close control for rotating the rotation member from the neutral position to a first position in the first direction in order to cause the latch mechanism to perform the close operation, the lock device has a half latch switch and a full latch switch which detect a state of the operation of the latch mechanism, the control device detects the state of the operation of the latch mechanism from ON and OFF states of the half latch switch and the full latch switch, and the opening and closing body is in a half door state in a case where the half latch switch is in the OFF state and the full latch switch is in the ON state, and the control device includes a neutral control portion that executes a neutral control for rotating the rotation member to the neutral position in a case where the close control becomes possible to be performed after a stop of the close control on the way, a vehicle state detection portion that detects moving of a vehicle after a start of the close control, and a restart control portion that restarts the close control without executing the neutral control for rotating the rotation member to the neutral position when the close control becomes possible to be performed after the stop of the close control on the way in a case where moving of the vehicle is detected after the opening and closing body is in the half door state and the start of the close control.

It is preferable that an opening and closing body control apparatus for a vehicle to another aspect of this disclosure includes a lock device that has a latch mechanism; and a control device that controls an operation of the lock device, the lock device has the latch mechanism which performs a close operation by shifting a half latch state to a full latch state, and the control device includes an initialization control portion that initializes the close operation in a case where the close control becomes possible to be performed after the close control causing the latch mechanism to perform the close operation is stopped on the way, and a retry control portion that executes the close control again after initialization of the close operation.

It is preferable that an opening and closing body control apparatus for a vehicle according to another aspect of this disclosure includes a lock device that has a latch mechanism; and a control device that controls the operation of the lock device, in which the control device includes an initialization control portion that initializes a close operation in a case where the close control becomes possible to be performed after the close control, which is stopped on the way, causing the latch mechanism to perform the close operation so as to be shifted from the half latch state to the full latch state, and a retry control portion that executes the close control again after the initialization of the close operation. Therefore, thereafter, in a case where the close control is executed again, it is possible to further reliably shift the latch mechanism to the full latch state.

According to the aspects of this disclosure, even in a case where the close control is stopped on the way, the lock device can correctly function.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening and closing body control apparatus for a vehicle, comprising:
   a lock device that includes a latch mechanism and a rotation member configured to press a latch lever, the rotation member rotating in a first direction and a second direction, the latch mechanism including a latch and the latch lever that rotates integrally with the latch, and the latch mechanism performing a close operation and a release operation according to a rotating direction of the rotation member by pressing the latch lever; and
   a control device that controls an operation of the lock device, wherein
   the control device executes a close control for rotating the rotation member from a neutral position to a first position in the first direction in order to cause the latch mechanism to perform the close operation, and
   the control device includes
      a neutral control portion that reversely rotates the rotation member to the neutral position in a case where the close control becomes possible to be performed after a stop of the close control on the way,
      a vehicle state detection portion that detects moving of a vehicle after a start of the close control, and
      a restart control portion that restarts the close control without executing a neutral control by the neutral control portion after the stop of the close control on the way, in a case where moving of the vehicle is detected after the lock device holds an opening and closing body at a fully closed position and the close control is started.

2. The opening and closing body control apparatus for a vehicle according to claim 1,
   wherein the restart control portion restarts the close control without executing the neutral control in a case where moving of the vehicle is detected when the close control becomes possible to be performed.

3. The opening and closing body control apparatus for a vehicle according to claim 1,
   wherein the control device includes a retry control portion that executes the close control again after the neutral control is executed in a case where moving of the vehicle is not detected after the start of the close control.

4. The opening and closing body control apparatus for a vehicle according to claim 1,
   wherein the control device includes
      a closed position determination portion that determines whether or not the opening and closing body is positioned at a position at which the latch mechanism has to perform the close operation in a case where the close control becomes possible to be performed, and
      a close prohibition portion that prohibits execution of the close control in a case where the opening and closing body is not positioned at a position at which the latch mechanism has to perform the close operation.

5. The opening and closing body control apparatus for a vehicle according to claim 1,
   wherein the lock device receives a supply of drive power for driving the lock device by a power source voltage of a vehicle-mounted power source, and
   wherein the control device includes
      a stop control portion that stops an operation control of the lock device when the power source voltage is lowered, and
      an execution permission portion that permits execution of the operation control in a case where the power source voltage is recovered.

6. The opening and closing body control apparatus for a vehicle according to claim 5,
   wherein the stop control portion stops the operation control of the lock device in a case where cranking of an engine is started, and
   the execution permission portion permits the execution of the operation control in a case where the cranking is completed.

7. The opening and closing body control apparatus for a vehicle according to claim 1,
   wherein the lock device has a half latch switch and a full latch switch which detect a state of the operation of the latch mechanism,
   the control device detects the state of the operation of the latch mechanism from ON and OFF states of the half latch switch and the full latch switch, and the opening and closing body is in a half door state in a case where the half latch switch is in the OFF state and the full latch switch is in the ON state, and the restart control portion restarts the close control without executing the neutral control for rotating the rotation member to the neutral position when the close control becomes possible to be performed after a stop of the close control on the way in a case where moving of the vehicle is detected after the opening and closing body is in the half door state and the close control is started.

8. An opening and closing body control apparatus for a vehicle, comprising:

a lock device that includes a latch mechanism and a rotation member configured to press a latch lever, the rotation member rotating in a first direction and a second direction, the latch mechanism including a latch and the latch lever that rotates integrally with the latch, and the latch mechanism performing a close operation and a release operation according to a rotating direction of the rotation member by pressing the latch lever; and a control device that controls an operation of the lock device, wherein the control device executes a close control for rotating the rotation member from a neutral position to a first position in the first direction in order to cause the latch mechanism to perform the close operation, the lock device has a half latch switch and a full latch switch which detect a state of the operation of the latch mechanism, the control device detects the state of the operation of the latch mechanism from ON and OFF states of the half latch switch and the full latch switch, and the opening and closing body is in a half door state in a case where the half latch switch is in the OFF state and the full latch switch is in the ON state, and the control device includes a neutral control portion that executes a neutral control for rotating the rotation member to the neutral position in a case where the close control becomes possible to be performed after a stop of the close control on the way, a vehicle state detection portion that detects moving of a vehicle after a start of the close control, and a restart control portion that restarts the close control without executing the neutral control by the neutral control portion after the stop of the close control on the way in a case where moving of the vehicle is detected after the opening and closing body is in the half door state and the start of the close control.

* * * * *